(12) United States Patent
Park et al.

(10) Patent No.: US 10,894,867 B2
(45) Date of Patent: Jan. 19, 2021

(54) MANUFACTURING METHOD OF SUPER ABSORBENT POLYMER

(71) Applicant: LG Chem, Ltd., Seoul (KR)

(72) Inventors: Sung Soo Park, Daejeon (KR); Jeong Kug Cho, Daejeon (KR); Yoon Jae Min, Daejeon (KR); Gicheul Kim, Daejeon (KR); Se Won Baek, Daejeon (KR); Kwang Hyon Kim, Daejeon (KR)

(73) Assignee: LG Chem, Ltd.

( * ) Notice: Subject to any disclaimer, the term of this patent is extended or adjusted under 35 U.S.C. 154(b) by 26 days.

(21) Appl. No.: 16/478,890

(22) PCT Filed: Dec. 3, 2018

(86) PCT No.: PCT/KR2018/015191
§ 371 (c)(1),
(2) Date: Jul. 18, 2019

(87) PCT Pub. No.: WO2019/143017
PCT Pub. Date: Jul. 25, 2019

(65) Prior Publication Data
US 2020/0247958 A1    Aug. 6, 2020

(30) Foreign Application Priority Data
Jan. 16, 2018 (KR) .................... 10-2018-0005708

(51) Int. Cl.
*C08J 3/07* (2006.01)
*C08J 3/075* (2006.01)
*C08J 3/12* (2006.01)
*C08J 3/24* (2006.01)

(52) U.S. Cl.
CPC ............ *C08J 3/075* (2013.01); *C08J 3/12* (2013.01); *C08J 3/245* (2013.01); *C08J 2333/08* (2013.01)

(58) Field of Classification Search
CPC ....... C08J 3/07; C08J 3/075; C08J 3/12; C08J 3/245; C08J 2333/08
USPC ....................................... 502/402
See application file for complete search history.

(56) References Cited

U.S. PATENT DOCUMENTS

| | | | |
|---|---|---|---|
| 4,950,692 | A | 8/1990 | Lewis et al. |
| 6,133,193 | A | 10/2000 | Kajikawa et al. |
| 2004/0249120 | A1 | 12/2004 | Nagasawa et al. |
| 2005/0181200 | A1 | 8/2005 | Mertens et al. |
| 2017/0233534 | A1 | 8/2017 | Kim et al. |
| 2017/0354952 | A1 | 12/2017 | Kim et al. |
| 2018/0079847 | A1 | 3/2018 | Lee et al. |
| 2018/0305503 | A1 | 10/2018 | Lim et al. |

FOREIGN PATENT DOCUMENTS

| | | |
|---|---|---|
| EP | 0417761 A2 | 3/1991 |
| EP | 0497623 A2 | 8/1992 |
| EP | 0759460 A1 | 2/1997 |
| EP | 0789047 A1 | 8/1997 |
| EP | 0844270 A1 | 5/1998 |
| EP | 2557095 A1 | 2/2013 |
| EP | 3067370 A1 | 9/2016 |
| EP | 3225649 A1 | 10/2017 |
| EP | 3321306 A1 | 5/2018 |
| EP | 3333198 A1 | 6/2018 |
| JP | H10204184 A | 8/1998 |
| JP | 2000189794 A | 7/2000 |
| JP | 2001058319 A | 3/2001 |
| JP | 2001079829 A | 3/2001 |
| JP | 2005015787 A | 1/2005 |
| JP | 2005511304 A | 4/2005 |
| KR | 100269980 B1 | 10/2000 |
| KR | 20140145810 A | 12/2014 |
| KR | 20160147250 A | 12/2016 |
| KR | 20170007094 A | 1/2017 |
| KR | 20170052480 A | 5/2017 |
| KR | 20170106154 A | 9/2017 |
| WO | 2015163519 A1 | 10/2015 |
| WO | 2017010660 A1 | 1/2017 |

OTHER PUBLICATIONS

Buchholz et al., "Modem Superabsorbent Polymer Technology", John Wiley & Sons, Inc., 1997, Chapter 3 (pp. 69-103) and Chapter 5 (pp. 199-201) and Figure 5.20.
Third Party Observation for PCT/KR2018/015191 submitted May 11, 2020, 10 pages.
George Odian, Principles of Polymerization, book, 1981, p. 203, Second Edition, John Wiley & Sons, Inc., United States of America.
International Search Report for Application No. PCT/KR2018/015191 dated Mar. 18, 2019, pp. 1-2.
Reinhold Schwalm, UV Coatings: Basics, Recent Developments and New Application, book, Dec. 2006, p. 115, Elsevier Science.
Extrusion Granulator Disk Pelleter, Product lineup Products, http://www.dalton.co.jp/product/detail/powder/granulator/extrusion_granulator/F.
Hosokawa Micron Corporation, Turbulizer TX, TCX Continuous Mixer, http.//hosokawamicron.co.jp/jp/product/42.
Powder molding machine (briquetting machine) Gonzo, ito-shoukai.com/product/gonzo. (Abstract Only)
Extended European Search Report including the Written Opinion for Application No. EP 18889940.5 dated Feb. 25, 2020, 7 pages.

*Primary Examiner* — Edward M Johnson
(74) *Attorney, Agent, or Firm* — Lerner, David, Littenberg, Krumholz & Mentlik, LLP (57) ABSTRACT

The present invention relates to a manufacturing method of a super absorbent polymer. More specifically, the present invention relates to a manufacturing method of a super absorbent polymer capable of reducing energy, reducing a process cost, and reducing a load on a device, at the time of drying due to reduction in an amount of water used during reassembly of fines, while manufacturing a super absorbent polymer exhibiting a reduced generation amount of re-fines and having excellent physical properties.

10 Claims, 7 Drawing Sheets

MANUFACTURING METHOD OF SUPER ABSORBENT POLYMER

CROSS-REFERENCE TO RELATED APPLICATIONS

The present application is a national phase entry under 35 U.S.C. § 371 of International Application No. PCT/KR2018/015191 filed Dec. 3, 2018, which claims priority from Korean Patent Application No. 10-2018-0005708 filed Jan. 16, 2018, the entire contents of which are incorporated herein by reference.

TECHNICAL FIELD

The present invention relates to a manufacturing method of a super absorbent polymer. More specifically, the present invention relates to a manufacturing method of a super absorbent polymer capable of reducing energy, reducing a process cost, and reducing a load on a device, at the time of drying due to reduction in an amount of water used during reassembly of fines, while manufacturing a super absorbent polymer exhibiting a reduced generation amount of re-fines and having excellent physical properties.

BACKGROUND

A super absorbent polymer (SAP) is a synthetic polymeric material capable of absorbing water about five hundred up to one thousand times the mass of its own. Commercial productions of the SAP began for use in sanitary equipments, nowadays, the use of SAP may be found in a very wide range of applications, including water combination soils for gardening, water-stop materials for engineering and construction, sheets for raising seeding, freshness-keeping agents in the food distribution field, and materials for sweating rooms, as well as personal hygiene products, such as disposable baby diapers.

An absorption mechanism of the super absorbent polymer is governed by interaction of osmotic pressure due to difference in electrical attraction caused by charges of a polymer electrolyte, affinity between water and a polymer electrolyte, molecular expansion due to repulsion between polymer electrolyte ions, and inhibition of expansion due to cross-linking. In other words, water absorbency of the super absorbent polymer depends on the above-described affinity and molecular expansion, and an absorption speed depends greatly on osmotic pressure of an absorbent polymer itself.

Meanwhile, particles having a particle diameter of 150 μm or less, which are unavoidably produced during a manufacturing process of a super absorbent resin, are referred to as fines, and it is known that the fines are generated at a proportion of about 20 to 30% in a pulverization process or in a transfer process during the manufacturing process of the super absorbent resin. When these fines are included in the super absorbent resin, main physical properties of the super absorbent resin may cause a reduction in absorption under pressure or permeability. For this reason, during the manufacturing process of the super absorbent resin, particularly in a classification process, the super absorbent polymer is manufactured only with polymer particles remaining after these fines are separated.

In addition, a method in which these separated fines are manufactured again as large particles through a reassembling process, and these reassembled particles are used again as a super absorbent polymer is known. In particular, as one representative method of these reassembling methods, a method in which a fine reassembly and a super absorbent polymer are manufactured by mixing the fines with water and aggregating the fines is known.

However, in the reassembling process, when the amount of water used is increased, an amount of energy used at the time of drying is increased, and the process cost is increased. Further, when moisture is not properly removed by drying after reassembling, problems such as an increase in the load on the device for manufacturing the super absorbent polymer, and the like, may occur.

Conversely, when the amount of water used in the reassembling process is reduced, there are disadvantages in that aggregation strength of the assembly is not sufficient and a generation amount of re-fines which are reduced into the fines without properly performing the reassembly is greatly increased, and the physical properties such as absorption ability, and the like, of the super absorbent polymer manufactured by the reassembling process are not sufficient.

Therefore, development of a process of reassembling fines capable of solving the above-described problems is continuously required.

TECHNICAL PROBLEM

The present invention has been made in an effort to provide a manufacturing method of a super absorbent polymer having advantages of manufacturing a fine reassembly exhibiting a reduced generation amount of fines and having excellent physical properties while having benefits in process by reducing an amount of water used at the time of reassembling fines.

TECHNICAL SOLUTION

An exemplary embodiment of the present invention provides a manufacturing method of a super absorbent polymer including: preparing a hydrogel polymer by performing thermal polymerization or photopolymerization on a monomer composition including a water-soluble ethylenically unsaturated monomer and a polymerization initiator; drying and pulverizing the hydrogel polymer, and performing classification into fines having a particle diameter of 150 μm or less and normal particles having a particle diameter of more than 150 μm to 850 μm or less; manufacturing a fine reassembly by mixing the fines with water, followed by reassembling; and manufacturing an extruded fine reassembly by extruding, pulverizing, and classifying the fine reassembly, wherein in the manufacturing of the fine reassembly, 1 to 30 parts by weight of water is used based on 100 parts by weight of the fines, and the manufacturing of the extruded fine reassembly includes extruding the fine reassembly at a temperature of 40 to 105° C.

ADVANTAGEOUS EFFECTS

The manufacturing method of a super absorbent polymer according to the present invention may reduce energy, reduce a process cost, and reduce a load on a device by a minimum drying process at the time of drying due to reduction in an amount of water used during reassembly of fines.

Further, according to the present invention, it is possible to improve strength of the fine reassembly by applying an extrusion process of a specific condition while having the above-described benefits in process, and as a result, it is possible to obtain a fine reassembly and a super absorbent polymer capable of reducing a generation amount of re-fines during a reassembling process and exhibiting better physical properties such as a high absorption speed and an excellent absorption ability.

MODE FOR INVENTION

The terms used herein are for the purpose of describing exemplary embodiments only and are not intended to limit the present invention. The singular expressions include a plurality of expressions unless expressly stated otherwise in the context. It will be further understood that the terms "comprises", "provides" and/or "has," when being used in this specification, specify the presence of stated features, numbers, steps, or components, or combinations thereof, but do not exclude the presence or addition of one or more other features, numbers, steps, components, or combinations thereof.

The present invention may be variously modified and may have various forms, and thus specific embodiments are illustrated and described in detail below. However, the present invention is not limited to the specific embodiments and should be construed as including all the changes, equivalents, and substitutions included in the spirit and scope of the present invention.

Hereinafter, a manufacturing method of a super absorbent polymer according to a specific embodiment of the present invention is described in more detail.

According to an embodiment of the present invention, there is provided a manufacturing method of a super absorbent polymer including: preparing a hydrogel polymer by performing thermal polymerization or photopolymerization on a monomer composition including a water-soluble ethylenically unsaturated monomer and a polymerization initiator; drying and pulverizing the hydrogel polymer, and performing classification into fines having a particle diameter of 150 μm or less and normal particles having a particle diameter of more than 150 μm to 850 μm or less; manufacturing a fine reassembly by mixing the fines with water, followed by reassembling; and manufacturing an extruded fine reassembly by extruding, pulverizing, and classifying the fine reassembly, wherein in the manufacturing of the fine reassembly, 1 to 30 parts by weight of water is used based on 100 parts by weight of the fines, and the manufacturing of the extruded fine reassembly includes extruding the fine reassembly at a temperature of 40 to 105° C.

As a result of continuous experiments by the present inventors, it has been found that it was possible to obtain an extruded fine reassembly exhibiting excellent strength by applying an extrusion process under specific conditions, for example, an extrusion process performed from 40 to 105° C., or 40 to 90° C., or 45 to 75° C., after reassembling fines even while relatively reducing an amount of water used at the time of reassembling the fines.

As a result, in the manufacturing process of the (extruded) fine reassembly and the super absorbent polymer using the same, a generation amount of re-fines may be reduced to at least as much as when an increased water usage is applied. In addition, it is possible to manufacture a super absorbent polymer exhibiting excellent physical properties such as a high absorption speed and an excellent absorption ability, while reducing the amount of water used.

In addition, due to the reduction in the amount of water used, it is possible to reduce the energy required for drying after reassembling the fines, to reduce the cost of the process, and to reduce the load on the device by a minimum drying process.

Therefore, according to an embodiment of the present invention, it is possible to provide a process of reassembling fines having various benefits in process, and a process of manufacturing a super absorbent polymer to which the fines reassembling process is applied, thereby manufacturing a super absorbent polymer exhibiting excellent physical properties.

Hereinafter, the manufacturing method of a super absorbent polymer of an embodiment is described in more detail for each step.

For reference, the term "polymer" or "high molecule" in the present specification means that a water-soluble ethylenically unsaturated monomer is in a polymerized state, and may include all water content ranges, all particle diameter ranges, all surface cross-linking states or processing states. Among the polymers, a polymer in which a percentage of moisture content (water content) is about 40 wt % or more before drying is performed after polymerization may be referred to as a hydrogel polymer. Further, among the polymers, a polymer having a particle diameter of 150 μm or less may be referred to as "fines".

Further, "the super absorbent polymer" means the polymer itself according to the context, or includes all polymers in a state suitable for commercialization through further processes such as surface cross-linking, fine reassembly, drying, pulverization, classifying, or the like, with respect to the polymer.

In the manufacturing method according to an embodiment, a hydrogel polymer is first prepared.

The hydrogel polymer may be prepared by performing thermal polymerization or photopolymerization on a monomer composition including a water-soluble ethylenically unsaturated monomer and a polymerization initiator.

The monomer composition which is a raw material of the super absorbent polymer includes the water-soluble ethylenically unsaturated monomer and the polymerization initiator.

The water-soluble ethylenically unsaturated monomer may be any monomer generally used in manufacturing the super absorbent polymer without any particular limitations. Here, the water-soluble ethylenically unsaturated monomer may be at least any one selected from the group consisting of anionic monomers and salts thereof, nonionic hydrophile-containing monomers, and unsaturated monomers containing amino groups, and quarternary compounds thereof.

Specifically, the water-soluble ethylenically unsaturated monomer may be at least any one selected from the group consisting of anionic monomers such as methacrylic acid, anhydrous maleic acid, fumaric acid, crotonic acid, itaconic acid, 2-acryloyl ethane sulfonic acid, 2-methacryloyl ethane sulfonic acid, 2-(meth)acryloyl propane sulfonic acid, or 2-(meth)acrylamide-2-methyl propane sulfonic acid, and salts thereof; nonionic hydrophile-containing monomers such as (meth)acrylamide, N-substituted(meth)acrylate, 2-hydroxyethyl (meth)acrylate, 2-hydroxypropyl(meth) acrylate, methoxypolyethylene glycol(meth)acrylate, or polyethylene glycol(meth)acrylate; and unsaturated monomers containing amino groups such as (N,N)-dimethylaminoethyl(meth)acrylate, or (N,N)-dimethylaminopropyl(meth)acrylamide, and quarternary compounds thereof.

More preferably, the acrylic acid or salts thereof, for example, an acrylic acid or alkali metal salts such as sodium salts thereof may be used. By using the monomer, it is possible to manufacture a super absorbent polymer having more excellent physical properties. When the alkali metal salt of the acrylic acid is used as the monomer, the acrylic acid may be neutralized with a basic compound such as caustic soda (NaOH) and used.

A concentration of the water-soluble ethylenically unsaturated monomer may be about 20 to about 60 wt %, preferably about 40 to about 50 wt %, based on the monomer composition including a raw material and a solvent of the super absorbent polymer, and may be controlled in consideration of polymerization time and reaction condition, and the like. However, when the concentration of the monomer is excessively low, the super absorbent polymer may have a low yield and have an economical problem. On the other hand, when the concentration thereof is excessively high, process problems may occur, for example, a part of the monomer may precipitate, pulverization efficiency may be low at the time of pulverizing the polymerized hydrogel polymer, or the like, and physical properties of the super absorbent polymer may be deteriorated.

The polymerization initiator used at the time of the polymerization in the manufacturing method of a super absorbent polymer of an embodiment is not particularly limited as long as it is generally used in manufacturing the super absorbent polymer.

Specifically, as the polymerization initiator, a thermal polymerization initiator or a photopolymerization initiator according to UV irradiation may be used depending on a polymerization method. Meanwhile, even if the photopolymerization method is performed, the thermal polymerization initiator may be additionally included since a predetermined amount of heat occurs by irradiation including ultraviolet irradiation, or the like, and in addition, as the polymerization reaction which is an exothermic reaction proceeds, some degree of heat occurs.

The photopolymerization initiator may be used without limitation in view of constitution as long as it is a compound capable of forming a radical by light such as ultraviolet rays.

The photopolymerization initiator may be, for example, at least one selected from the group consisting of benzoin ether, dialkyl acetophenone, hydroxyl alkylketone, phenyl glyoxylate, benzyl dimethyl ketal, acyl phosphine, and α-aminoketone. Meanwhile, as a specific example of the acylphosphine, a commonly used lucirin TPO, that is, 2,4,6-trimethyl-benzoyl-trimethyl phosphine oxide may be used. More various photo-polymerization initiators are well described in "UV Coatings: Basics, Recent Developments and New Application (Elsevier, 2007)", page 115, written by Reinhold Schwalm. However, the present invention is not limited to the above-described examples.

The photopolymerization initiator may be included at a concentration of about 0.01 to about 1.0 wt % based on the monomer composition. When the concentration of the photopolymerization initiator is excessively low, a polymerization speed may be reduced. When the concentration of the photopolymerization initiator is excessively high, a molecular weight of the super absorbent polymer may be small and physical properties thereof may be non-uniform.

In addition, the thermal polymerization initiator may be at least one selected from the group consisting of a persulfate-based initiator, an azo-based initiator, hydrogen peroxide, and an ascorbic acid. Specifically, examples of the persulfate-based initiator may include sodium persulfate $(Na_2S_2O_3)$, potassium persulfate $(K_2S_2O_8)$, ammonium persulfate $((NH_4)_2S_2O_8)$, and the like, and examples of the azo-based initiator may include 2,2-azobis(2-amidinopropane)dihydrochloride, 2,2-azobis-(N,N-dimethylene)isobutyramidine dihydrochloride, 2-(carbamoylazo)isobutylonitrile, 2,2-azobis[2-(2-imidazolin-2-yl)propane]dihydrochloride, 4,4-azobis-(4-cyanovaleric acid), and the like. More various thermal polymerization initiators are well described in "Principle of Polymerization (Wiley, 1981)", page 203, written by Odian. However, the present invention is not limited to the above-described examples.

The thermal polymerization initiator may be included at a concentration of about 0.001 to about 0.5 wt % based on the monomer composition. When the concentration of the thermal polymerization initiator is excessively low, additional thermal polymerization is hardly performed, and thus, an effect of addition of the thermal polymerization initiator may be insignificant. When the concentration of the thermal polymerization initiator is excessively high, the molecular weight of the super absorbent polymer may be small and physical properties thereof may be non-uniform.

According to an exemplary embodiment of the present invention, the monomer composition may further include an internal cross-linking agent as a raw material for the super absorbent polymer. As the internal cross-linking agent, a cross-linking agent having at least one functional group capable of reacting with a water-soluble substituent of the water-soluble ethylenically unsaturated monomer while having at least one ethylenically unsaturated group; or a cross-linking agent having at least two functional groups capable of reacting with the water-soluble substituent of the monomer and/or a water-soluble substituent formed by hydrolysis of the monomer, may be used.

Specific examples of the internal cross-linking agent may include C8-C12 bisacrylamide, bismethacrylamide, poly(meth)acrylate of C2-C10 polyol or poly(meth)allylether of C2-C10 polyol, and more specifically, at least one selected from the group consisting of N,N'-methylenebis(meth)acrylate, ethyleneoxy(meth)acrylate, polyethyleneoxy(meth)acrylate, propyleneoxy(meth)acrylate, glycerin diacrylate, glycerin triacrylate, trimethylol triacrylate, triallyl amine, triallyl cyanurate, triallyl isocyanate, polyethylene glycol, diethylene glycol, and propylene glycol.

The internal cross-linking agent may be included at a concentration of about 0.01 to about 0.5 wt % based on the monomer composition to cross-link the polymerized polymer.

In the manufacturing method according to an embodiment of the present invention, the monomer composition of the super absorbent polymer may further include additives such as a thickener, a plasticizer, a storage stabilizer, an antioxidant, and the like, if necessary.

The above-described raw materials such as the water-soluble ethylenically unsaturated monomer, the photopolymerization initiator, the thermal polymerization initiator, the internal cross-linking agent, and the additives may be prepared in a form of a monomer composition solution dissolved in a solvent.

Here, the solvent that is usable without limitation in view of constitution as long as it is capable of dissolving the above-described components. For example, the solvent may be used in combination of at least one selected from water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethyl ether, toluene, xylene, butylolactone, carbitol, methylcellosolve acetate, and N,N-dimethylacetamide, and the like.

The solvent may be included in a residual content excluding the above-described components with respect to the total content of the monomer composition.

Meanwhile, a method of forming the hydrogel polymer by thermal polymerization or photopolymerization of such a monomer composition is not particularly limited in view of constitution as long as it is a generally used polymerization method.

Specifically, the polymerization method is largely divided into thermal polymerization and photopolymerization depending on a polymerization energy source. It is general the thermal polymerization may be performed in a reactor having an agitator shaft such as a kneader, and the photopolymerization may be performed in a reactor equipped with a movable conveyor belt. However, these above-described polymerization methods are described by way of example, and the present invention is not limited to the above-described polymerization methods.

For example, the hydrogel polymer obtained by supplying hot air to the reactor such as the kneader equipped with the agitator shaft as described above, or heating the reactor to perform the thermal polymerization may be discharged to a reactor outlet according to a form of the agitator shaft provided in the reactor, and may have a size of several centimeters to several millimeters. Specifically, the size of the obtained hydrogel polymer may vary depending on the concentration, an injection speed, and the like, of the monomer composition to be injected. Generally, the hydrogel polymer may have a weight average particle diameter of 2 to 50 mm.

In addition, when the photopolymerization is performed in the reactor provided with the movable conveyer belt as described above, the generally obtained hydrogel polymer may be a sheet-shaped hydrogel polymer having a width of the belt. Here, the thickness of the polymer sheet varies depending on the concentration and the injection speed of the monomer composition to be injected, but it is preferred to supply the monomer composition so that it is possible to obtain the sheet-shaped polymer having a thickness of generally about 0.5 to about 5 cm. When supplying the monomer composition such an extent that the thickness of the sheet-shaped polymer has an excessively thin thickness, it is not preferred since production efficiency may be low. When the thickness of the sheet-shaped polymer is more than 5 cm, the polymerization reaction may not be uniformly performed throughout an overall thickness due to the excessively thick thickness.

Here, a percentage of moisture content of the hydrogel polymer obtained by this method may be generally about 40 to about 80 wt %. Meanwhile, throughout the present specification, the term "percentage of moisture content" refers to a content of moisture occupied with respect to the total weight of the hydrogel polymer, and means a value obtained by subtracting a weight of a dried polymer from the weight of the hydrogel polymer. Specifically, the water content is defined as a value calculated by measuring a weight loss due to moisture evaporation in the polymer during a drying process by raising temperature of the polymer through infrared heating. Here, the percentage of moisture content is measured under drying conditions in which a temperature is raised from room temperature up to about 180° C., and then the temperature is maintained at 180° C., wherein a total drying time is set as 20 minutes, including 5 minutes for a temperature rising step.

According to an embodiment of the present invention, a coarse-pulverization process may optionally be further performed on the hydrogel polymer obtained above.

Here, a pulverizer to be used for the coarse-pulverization process is not limited in view of constitution, but specifically, may include any one selected from pulverizing devices groups consisting of a vertical pulverizer, a turbo cutter, a turbo grinder, a rotary cutter mill, a cutter mill, a disc mill, a shred crusher, a crusher, a chopper, and a disc cutter, and is not limited to the above-described examples.

Here, the coarse-pulverization may be performed so that a particle diameter of the hydrogel polymer is about 2 to about 20 mm.

It is not technically easy to perform coarse-pulverization so as to have the particle diameter of less than 2 mm since the percentage of moisture content of the hydrogel polymer is high, and pulverized particles may aggregate with each other. On the other hand, when the coarse pulverization is performed to have the particle diameter of more than 20 mm, an effect of increasing the efficiency of the subsequent drying step may not be significant.

Meanwhile, in the manufacturing method of a super absorbent polymer according to an embodiment of the present invention, after the hydrogel polymer is prepared, the hydrogel polymer may be dried, pulverized, and classified into fines and normal particles.

The drying process is performed on the hydrogel polymer which is subjected to the coarse-pulverization or immediately after the polymerization without performing the coarse-pulverization. Here, a drying temperature of the drying step may be about 150 to about 250° C. When the drying temperature is less than 150° C., a drying time may be excessively increased, and physical properties of the finally formed super absorbent polymer may be deteriorated, and when the drying temperature is more than 250° C., only a surface of the polymer may be excessively dried, such that fines may occur in the subsequent pulverization process and physical properties of the finally formed super absorbent polymer may be deteriorated. Accordingly, preferably, the drying may be performed at a temperature of about 150 to about 200° C., and more preferably, about 160 to about 180° C.

Meanwhile, the drying may be performed for about 20 to about 90 minutes in consideration of process efficiency, and the like, but time required for the drying is not limited thereto.

In addition, any drying method of the drying step may be used without limitation in view of constitution as long as it is generally used as a drying process of the hydrogel polymer. Specifically, the drying process may be performed by hot air supply, infrared irradiation, microwave irradiation, ultraviolet irradiation, and the like. A percentage of moisture content of the polymer after the drying step is performed may be about 0.1 to about 10 wt %.

Next, the dried polymer obtained by the drying step is subjected to pulverization.

Polymer powder obtained after the pulverization step may have a particle diameter of about 150 μm or about 850 μm. A pulverizer used to perform the pulverization into the above-described particle diameter may be specifically a pin mill, a hammer mill, a screw mill, a roll mill, a disc mill, a jog mill, and the like, but the present invention is not limited to the above-described examples.

In order to control physical properties of the super absorbent polymer powder which is manufactured as a final product after the pulverization step, the polymer powder obtained after pulverization is generally classified according to the particle diameter. Preferably, the polymer powder is classified into particles having a particle diameter of about 150 µm or less and particles having a particle diameter of more than about 150 to 850 µm or less.

In the present specification, fine particles having a particle size of a predetermined particle size or less, i.e., about 150 µm or less, are referred to as super absorbent polymer fines, SAP fines or fines (fine powder), and particles having a particle diameter of more than about 150 µm to about 850 µm or less are referred to as normal particles. The fines may occur during the polymerization process, the drying process, or the pulverization step of the dried polymer. If the fines are included in final products, it is difficult to handle, and physical properties may be deteriorated, for example, gel blocking phenomenon may occur, and the like. Therefore, it is preferred to exclude the fines so as not to include the fines in the final resin product or to reuse the fines to be normal particles.

As an example, a reassembling process in which the fines are aggregated to have a normal particle size may be performed. In order to increase aggregation strength during the reassembling process, a reassembling process in which the fine particles are aggregated in a wet state is generally performed. Here, the higher the percentage of moisture content of the fines, the higher the aggregation strength of the fines, but excessively large reassembly crumbs occur during the reassembling process, causing problems during process operation. When the lower the percentage of moisture content, the reassembling process is easy, but the aggregation strength is low, and thus there are many cases that the fine particles are crushed to be fines again after the reassembling process (formation of re-fines). In addition, the obtained fine reassembly has lower physical property such as centrifugal retention capacity (CRC) or absorption under pressure (AUP) than normal particles, which causes a decrease in quality of the super absorbent polymer.

However, as described above, in the manufacturing method of an embodiment, as the reassembling process and the extrusion process are performed under the specific conditions, it is possible to obtain an extruded fine reassembly having a high aggregation strength and a low generation amount of re-fines while the reassembling process is performed by reducing the amount of water used at the time of the reassembling process.

Thus, in the manufacturing method of a super absorbent polymer according to an embodiment of the present invention, a fine reassembly is manufactured by using the fines classified in the above-described step. More specifically, in the reassembling step, the fines are mixed with water, followed by reassembling, wherein water may be added in an amount of 1 to 30 parts by weight, or 3 to 27 parts by weight, or 5 to 20 parts by weight based on 100 parts by weight of the fines.

Here, when the amount of water is less than 1 part by weight, it is difficult to uniformly disperse a small amount of water due to a fast absorption speed of the fines in the mixing process of the fines and water, and thus there is a concern that uniformity of the fine reassembly is lowered. In addition, when the percentage of moisture content of the fine reassembly to be manufactured is lowered, hard crumbs are formed during the subsequent extrusion process, and thus extrusion process operation stability may be lowered, the generation amount of re-fines may be increased, and the absorption ability of the finally manufactured super absorbent polymer may be deteriorated. On the contrary, when the water amount is more than 30 parts by weight, stickiness of the fine reassembly is increased during the mixing process, the mixing is not normally performed, and an amount of water to be evaporated during the drying process is increased, thus increasing a load on a dryer. In addition, when the drying is not properly performed, a load on an extruder may be increased, and thus the extrusion process may not proceed properly.

The step of manufacturing the fine reassembly may be performed by mixing the fines and water at 300 to 2000 rpm under stirring using a mixing device or a mixer capable of applying a shearing force.

Meanwhile, after the reassembling process is performed, the extruded fine reassembly may be manufactured using the fine reassembly. Specifically, the step of manufacturing an extruded fine reassembly may be performed by extruding, pulverizing, and classifying the fine re-assembly to manufacture the extruded fine reassembly, and particularly, the step may be performed by including extruding the fine reassembly at 40 to 105° C., or 40 to 90° C., or 45 to 75° C.

As the extrusion process is performed under these temperature conditions, the amount of water used in the reassembling process described above may be reduced, and as the extruded fine reassembly having a high strength is manufactured, it is possible to obtain a super absorbent polymer reducing the generation amount of re-fines and exhibiting excellent physical properties.

The extrusion process with respect to the fine reassembly may be performed using a conventional extruder capable of extruding and cutting the fine reassembly such as, for example, a (meat) chopper, wherein the cutting process may be performed by a cutter such as a blade or a scrapper installed at a rear end of the extruding process, for example, at a hole plate outlet.

For example, when using a meat chopper provided with a blade having two blades in a hole plate outlet, first, the fine reassembly is put into the meat chopper, the fine reassembly is extruded by the meat chopper, and the extruded fine reassembly is cut into the forms of particles by the blade located on the side of the hole plate outlet. Here, the extruded fine reassemblies that are cut into particles are recombined due to stickiness at the cut part to be secondary particles in the form of a stem.

Next, in the manufacturing method of a super absorbent polymer according to an embodiment of the present invention, the extruded fine reassembly manufactured in the above step may be dried, pulverized, and classified into reassembly fines (hereinafter referred to as "re-fines") and reassembly normal particles. The reassembly fines and the reassembly normal particles may each have a particle size of 150 µm or less and a particle diameter of more than 150 µm to 850 µm or less.

The drying process may be performed using a conventional dryer, but may be performed using a paddle-type dryer according to an embodiment of the present invention. When the drying process is performed in the paddle-type dryer, a recombination of the secondary-particulated extruded fine reassembly in the form of a stem may be easily broken by force generated when the paddle flows, and may be more easily primary-particulated. As a result, a drying speed and drying efficiency with respect to the extruded fine reassembly may be further increased.

Further, the drying process may be performed at a temperature of 120 to 220° C. In the drying process, when the temperature is less than 120° C., a drying time may be increased, and when the temperature exceeds 220° C., physical properties may be deteriorated due to deterioration of the fine reassembly. More preferably, the drying process may be performed at a temperature of 150 to 200° C. so that the percentage of moisture content in the fine reassembly is 1 wt % or less.

Further, it is preferable to increase the temperature to a latter stage of the drying process within the above-described temperature range as compared to an initial stage of the drying process since a drying efficiency is capable of being further increased. Specifically, it is more preferable that a temperature at the initial stage of the drying process, specifically, at the dryer inlet is 120 to 160° C., and a temperature at the latter stage of the drying process, specifically, at a rear end outlet of the dryer is 150 to 200° C. to increase the drying efficiency.

In addition, the means of raising the temperature during the drying process is not limited in view of a constitution. Specifically, the raising of the temperature may be performed by supplying thermal media or directly heating by electricity, and the like, but the present invention is not limited to the above-described examples. Specific examples of heat sources to be usable may include steam, electricity, ultraviolet rays, infrared rays, and the like, and may be a heated thermal fluid, and the like.

In addition, the drying process may be performed so that the percentage of moisture content in the dried extruded fine reassembly is 1 wt % or more, and more specifically, 2 wt %. When the percentage of moisture content in the dried extruded fine reassembly is less than 1 wt %, there is concern that physical properties of the fine reassembly are deteriorated.

By the drying process as described above, the fine reassembly that is secondary-particulated in the form of a stem is primary-particulated in the form of a single particle.

The extruded fine reassembly obtained after the drying process has high aggregation strength since a proportion at which the fine particles are re-crushed again into fines after the pulverization step, that is, a proportion of formation of re-fines, is low.

Specifically, in the extruded fine reassembly, a weight ratio of the fines having a particle diameter of 150 μm or less after the pulverization may be about 50 wt % or less, or 45 wt % or less, based on the weight of the total extruded fine reassembly.

Further, the extruded fine reassembly obtained after pulverization may be classified into particles having a particle diameter of 150 μm or less, particles having a particle diameter of more than 150 μm to less than 300 μm, particles having a diameter of 300 μm or more to less than 600 μm, particles having a diameter of 600 μm or more to 850 μm or less, and particles having a diameter of more than 850 μm.

Here, in the extruded fine reassembly having a particle diameter of 300 to 600 μm, the centrifugal retention capacity (CRC) measured according to EDANA method WSP 241.3 may be 33.0 to 45.0 g/g, and an absorption speed by a vortex method may be 50 seconds or less. The measurement by the vortex method is performed by putting 50 ml of saline into a 100 ml beaker together with a magnetic stirring bar, setting a stirring speed of the magnetic stirring bar to 600 rpm using a stirrer, putting 2.0 g of a super absorbent polymer into the stirring saline and simultaneously measuring the time when putting the fine reassembly, and then measuring the time (unit: second) taken until vortex disappears in the beaker, which is set as the vortex time. The lower limit value of the absorption speed is not particularly limited, but may be about 20 seconds or more, or about 30 seconds or more.

Further, the extruded fine reassembly may have the percentage of moisture content of 30% or less, and may exhibit excellent particle strength even though the extruded fine reassembly has such a low percentage of moisture content.

Next, the dried extruded fine reassembly is pulverized and classified.

Next, the dried extruded fine reassembly may be pulverized to have a particle size of about 150 to about 850 μm. A pulverizer used to perform the pulverization into the above-described particle size may be specifically a pin mill, a hammer mill, a screw mill, a roll mill, a disc mill, a jog mill, or the like, but the present invention is not limited to the above-described examples.

In order to control physical properties of the super absorbent polymer powder which is manufactured as a final product after the pulverization step, the polymer powder obtained after pulverization is generally classified according to the particle size. Preferably, the polymer powder is subjected to the classifying step into re-fines having a particle diameter of 150 μm or less and reassembly normal particles having a particle diameter of more than 150 μm to 850 μm or less.

Meanwhile, in the manufacturing method of a super absorbent polymer according to an embodiment of the present invention, the super absorbent polymer may be manufactured by using the extruded fine reassembly manufactured by the above-described method, particularly, the reassembly normal particles alone. However, the super absorbent polymer may be manufactured by mixing the reassembly normal particles with fine non-reassembled normal particles, followed by selective cross-linking.

Specifically, the refines having a particle diameter of 150 μm or less after the classification is circulated to the fine reassembling process, and the reassembly normal particles having a particle diameter of more than 150 μm to 850 μm or less are mixed with the normal particles described above. In addition, after the mixing process, a surface cross-linking process may be selectively performed by further introducing the reassembly normal particles and the normal particles into a surface cross-linking mixer.

The surface cross-linking process is a step of increasing a cross-linking density near a surface of the super absorbent polymer particle in relation to a cross-linking density in the particle. In general, a surface cross-linking agent is applied to the surface of the super absorbent polymer particle. Thus, this reaction is generated on the surface of the super absorbent polymer particles, which improves crosslinkability on the surface of the particles without substantially affecting an inside of the particles. Accordingly, surface cross-linked super absorbent polymer particles have a higher cross-linking degree in the vicinity of the surface than in the inside.

Here, the surface cross-linking agent is not limited in view of constitution as long as it is a compound capable of reacting with a functional group of the polymer.

Preferably, in order to improve properties of the super absorbent polymer to be manufactured, as the surface cross-linking agent, at least one selected from the group consisting of a polyhydric alcohol compound; an epoxy compound; a polyamine compound; a haloepoxy compound; a condensation product of the haloepoxy compound; oxazoline compounds; mono-, di- or polyoxazolidinone compound; a cyclic urea compound; a polyvalent metal salt; and an alkylene carbonate compound, may be used.

Specific examples of the polyhydric alcohol compound may include at least one selected from the group consisting of mono-, di-, tri-, tetra- or polyethylene glycol, monopropylene glycol, 1,3-propanediol, dipropylene glycol, 2,3,4-trimethyl-1,3-pentanediol, polypropylene glycol, glycerol, polyglycerol, 2-butene-1,4-diol, 1,4-butanediol, 1,3-butanediol, 1,5-pentanediol, 1,6-hexanediol, and 1,2-cyclohexane dimethanol.

Further, the epoxy compound may be ethylene glycol diglycidyl ether and glycidol, and the like. The polyamine compound may be at least one selected from the group consisting of ethylene diamine, diethylene triamine, triethylene tetramine, tetraethylene pentamine, pentaethylene hexamine, polyethylene imine, and polyamide polyamine.

Further, the haloepoxy compound may be epichlorohydrin, epibromohydrin, and α-methyl epichlorohydrin. Meanwhile, examples of the mono-, di- or polyoxazolidinone compound may include 2-oxazolidinone, and the like.

In addition, ethylene carbonate, or the like, may be used as the alkylene carbonate compound. The above-described compounds may be used alone, respectively, or may be combined with each other. Meanwhile, in order to increase efficiency of the surface cross-linking process, it is preferable to use at least one polyhydric alcohol compound among these surface cross-linking agents, more preferably a polyhydric alcohol compound having 2 to 10 carbon atoms.

The content of the surface cross-linking agent to be added may be appropriately selected depending on the specific kind of the surface cross-linking agent to be added and reaction conditions, but generally, may be about 0.001 to 5 parts by weight, preferably about 0.01 to about 3 parts by weight, and more preferably about 0.05 to about 2 parts by weight, with respect to 100 parts by weight of the polymer.

When the content of the surface cross-linking agent is excessively small, a surface cross-linking reaction hardly occurs. When the content of the surface cross-linking agent is more than 5 parts by weight with respect to 100 parts by weight of the polymer, absorption ability and physical properties may be deteriorated due to excessive surface cross-linking reaction.

The surface cross-linking reaction and the drying may be performed simultaneously by heating the polymer particles to which the surface cross-linking agent is added.

The means of raising the temperature for the surface cross-linking reaction is not particularly limited. The polymer particles may be heated by supplying thermal media or directly supplying heat sources. Here, examples of the thermal media to be usable may include temperature-raising fluids such as steam, hot air, and hot oil, and the like. However, the present invention is not limited to the above-described examples. In addition, a temperature of the supplied thermal media may be appropriately selected in consideration of the means of thermal media, the raising rate of the temperature, and target temperature in raising temperature. Meanwhile, examples of the heat source to be directly supplied may include heating through electricity, and heating through gas. However, the present invention is not limited to the above-described examples.

Further, after the surface cross-linking, the fines may be classified into surface cross-linked fines having a particle diameter of 150 μm or less and surface cross-linked normal particles having a particle diameter of more than 150 μm to 850 μm or less, and the surface-crosslinked fines having a particle diameter of 150 μm or less may be re-put into a process for fine reassembly, and the surface cross-linked normal particles may be manufactured and used as products.

The super absorbent polymer manufactured by the above-described method is a super absorbent polymer in which an extruded fine reassembly, which is obtained by mixing fines with water and performing reassembly, is subjected to surface cross-linking, wherein the fines have a particle diameter of 150 μm or less in a polymer obtained by polymerizing a water-soluble ethylenically unsaturated monomer in which an acidic group is included and at least one portion of the acidic group is neutralized, wherein a centrifugal retention capacity (CRC) measured according to EDANA method WSP 241.3 is 33.0 to 45.0 g/g; and an absorption speed by a vortex method is 50 seconds or less.

In the super absorbent polymer of an exemplary embodiment, the polymer is obtained by polymerizing the water-soluble ethylenically unsaturated monomer in which the acidic group is included and at least one portion of the acidic group is neutralized. Specific details of specific materials used therefor and manufacturing method thereof are the same as those illustrated above.

Hereinafter, the present invention is described in detail with reference to Examples. However, the following Examples are only illustrative of the present invention, and do not limit the disclosure of the present invention in any way. Further, unless otherwise specified, "%" and "part" representing the content in the following Examples and Comparative Examples are on a mass basis.

EXAMPLE

Manufacture of Super Absorbent Polymer Particles

Preparation Example 100 g of acrylic acid, 0.3 g of polyethyleneglycol diacrylate as a cross-linking agent, 0.033 g of sodium persulfate as an initiator, 38.9 g of caustic soda (NaOH), and 103.9 g of water were mixed to prepare a monomer mixture having a monomer concentration of 50 wt %.

Then, the monomer mixture was put on a continuously moving conveyor belt, irradiated with ultraviolet light (irradiation amount: 2 mW/cm$^2$), followed by UV polymerization for 2 minutes, thereby obtaining a hydrogel polymer.

The hydrogel polymer was pulverized with a meat chopper (hole size of 10 mm) to obtain a coarse-pulverized hydrogel polymer. The hydrogel polymer was dried in a hot air dryer at 170° C. for 1 hour, pulverized with a pin mill, and classified with a standard mesh of ASTM standard to obtain normal particles having a particle size of more than 150 μm to 850 μm or less and fine powder particles having a particle diameter of 150 μm or less.

Preparation Example of Fine Powder Reassembly

Comparative Example 1

Figure 1:
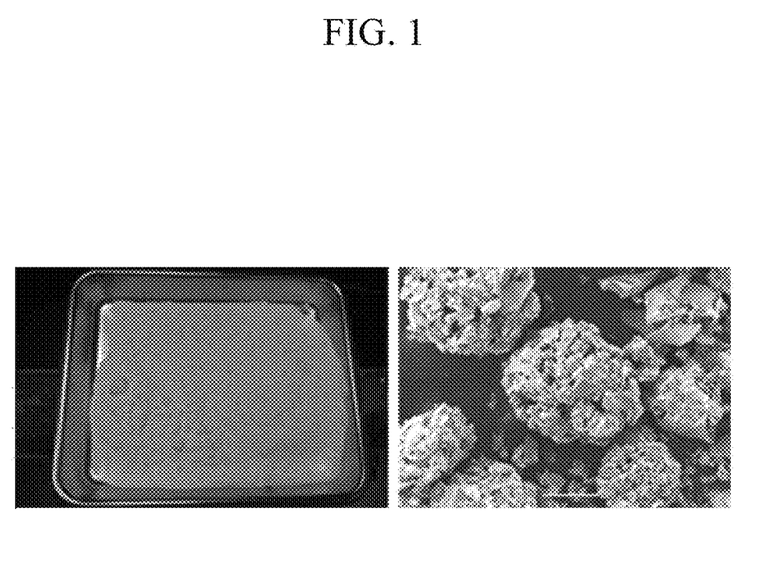
FIGS. 1 to 5 are images (left) of Comparative Examples 1 to 5 after mixing fines and water, followed by reassembling, and electron microscope images (right) of Comparative Examples 1 to 5 showing particle forms of finally manufactured fine reassembly.

100 g of the fines having a particle size of 150 μm or less in the super absorbent polymer manufactured in Preparation Example 1 was added in a mixer, and 5 g of water was added thereto while stirring at 650 rpm, and the obtained mixture was mixed for 1 minute to obtain a fine reassembly. The image taken at this time is shown on the left side of FIG. 1, and fines that were not mixed with water were observed.

The reassembly recovered in the mixer was dried in a forced circulation dryer at 185° C. for 1 hour. The dried reassembly was pulverized with a Hammer mill and classified, and as a result, it was confirmed that a proportion of re-fines having a particle size of 150 μm or less was 81.2 wt %. The particle shape of the thus-manufactured fine reassembly was analyzed by an electron microscope, and an image thereof is shown on the right side of FIG. 1.

Comparative Example 2

A fine reassembly was manufactured in the same manner as in Comparative Example 1, except that 10 g of water was used in the reassembling process. Deleted Texts The image after the reassembling process is shown on the left side of FIG. 2, and fines that were not mixed with water were observed.

Figure 2:
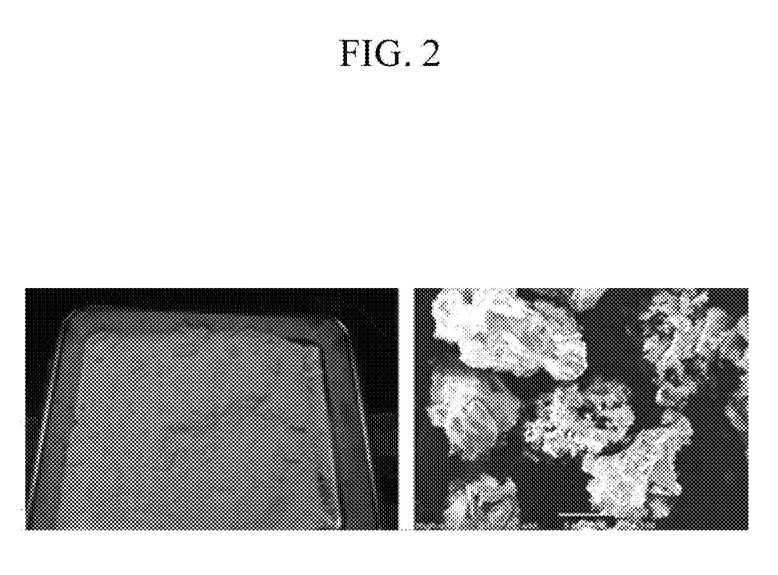

Further, the particle shape of the finally manufactured fine reassembly was analyzed by an electron microscope, and an image thereof is shown on the right side of FIG. 2. It was confirmed that the re-fines of Comparative Example 2 had a proportion of 64.1 wt %.

Comparative Example 3

A fine reassembly was manufactured in the same manner as in Comparative Example 1, except that 20 g of water was used in the reassembling process. The image after the reassembling process is shown on the left side of FIG. 3, and fines that were not mixed with water were not observed.

Figure 3:
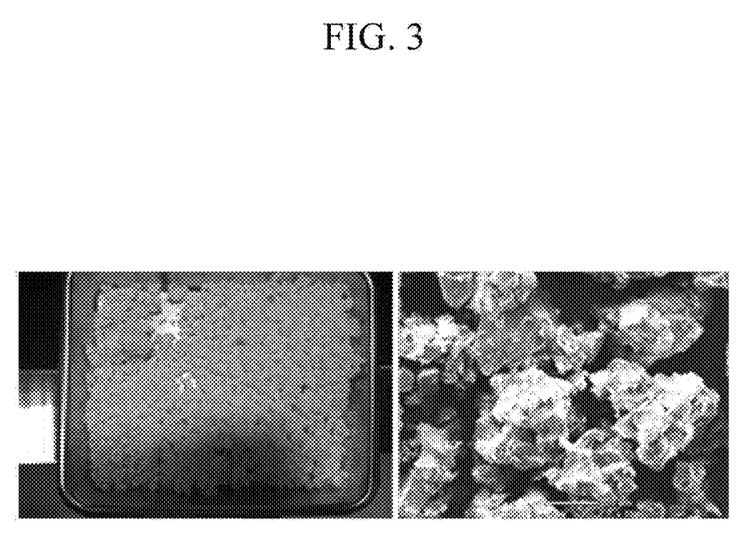

Further, the particle shape of the finally manufactured fine reassembly was analyzed by an electron microscope, and an image thereof is shown on the right side of FIG. 3. It was confirmed that the re-fines of Comparative Example 3 had a proportion of 53.1 wt %.

Comparative Example 4

A fine reassembly was manufactured in the same manner as in Comparative Example 1, except that 40 g of water was used in the reassembling process. The image after the reassembling process is shown on the left side of FIG. 4, and fines that were not mixed with water were not observed.

Figure 4:
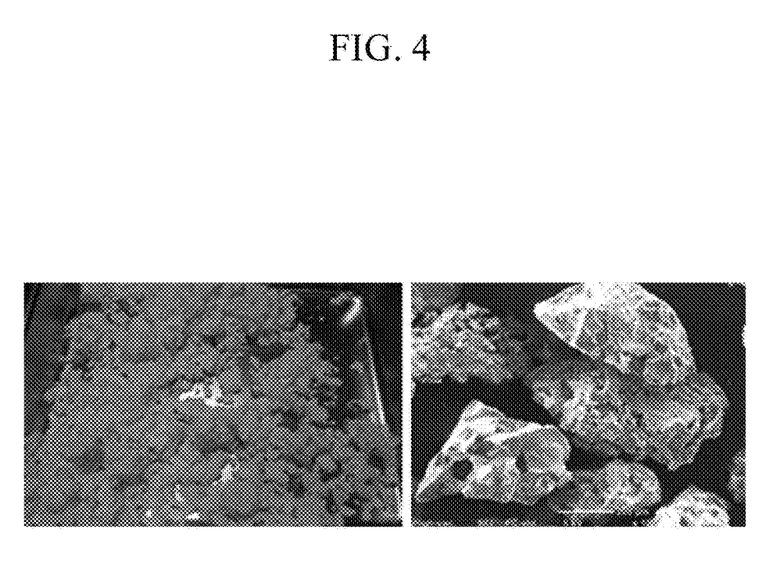

Further, the particle shape of the finally manufactured fine reassembly was analyzed by an electron microscope, and an image thereof is shown on the right side of FIG. 4. It was confirmed that the re-fines of Comparative Example 4 had a proportion of 54.1 wt %.

Comparative Example 5

A fine reassembly was manufactured in the same manner as in Comparative Example 1, except that 120 g of water was used in the reassembling process. The image after the reassembling process is shown on the left side of FIG. 5, and fines that were not mixed with water were not observed.

Figure 5:
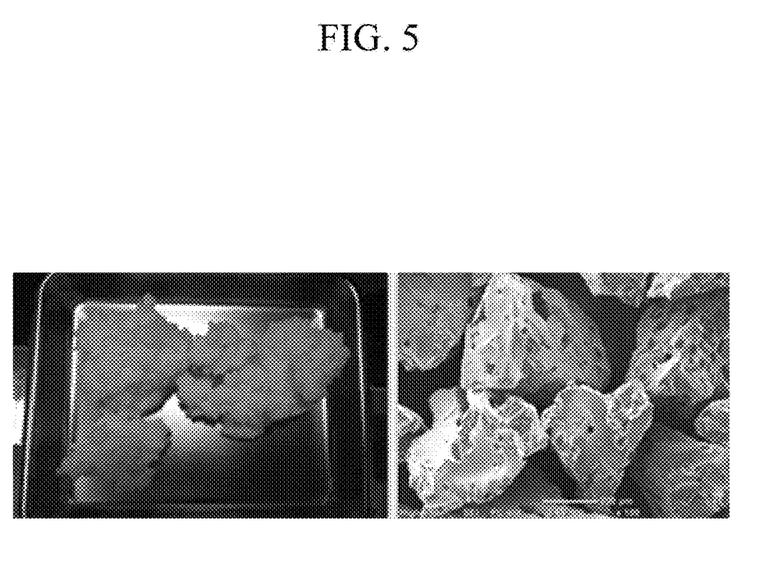

Further, the particle shape of the finally manufactured fine reassembly was analyzed by an electron microscope, and an image thereof is shown on the right side of FIG. 5. It was confirmed that the re-fines of Comparative Example 5 had a proportion of 22.8 wt %.

Example 1

Figure 6:
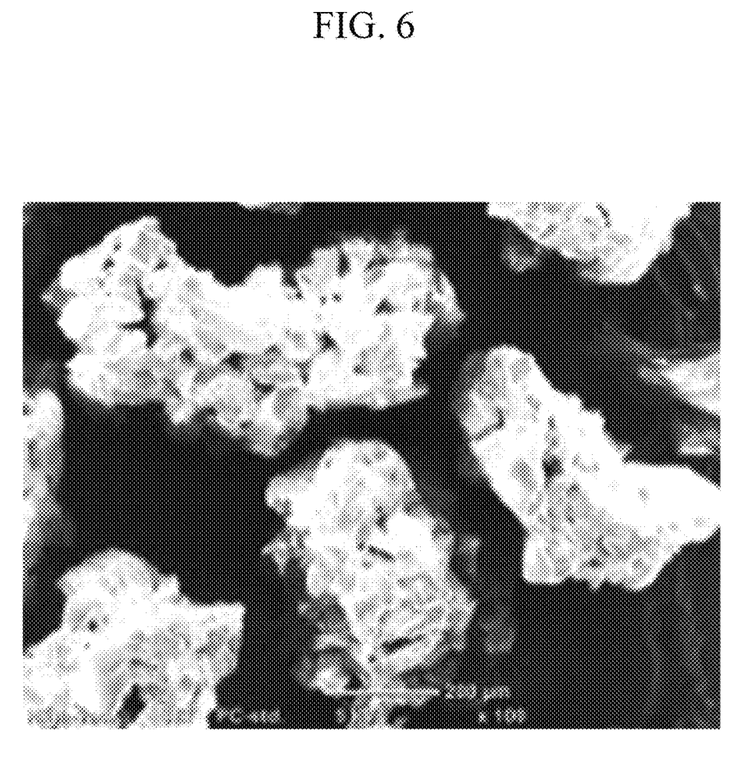
FIGS. 6 and 7 are electron microscope images of Examples 1 and 2 showing particle forms of the finally manufactured and extruded fine reassembly.

100 g of the fines having a particle size of 150 μm or less in the super absorbent polymer manufactured in Preparation Example 1 was added in a mixer, and 20 g of water was added thereto while stirring at 650 rpm, and the obtained mixture was mixed for 1 minute to obtain a fine reassembly. The reassembly recovered in the mixer was put into a chopper in which a temperature of an outer wall was heated, and extruded. Here, it was confirmed that the temperature of the extruded fine reassembly to be discharged was 45° C. The recovered extruded fine reassembly was dried in a forced circulation dryer at 185° C. for 1 hour. The dried reassembly was pulverized with a Hammer mill and classified, and as a result, it was confirmed that a proportion of re-fines having a particle size of 150 μm or less was 47.7 wt %. The particle shape of the thus-manufactured extruded fine reassembly was analyzed by an electron microscope, and an image thereof is shown on FIG. 6.

Example 2

A fine reassembly and an extruded fine reassembly were manufactured in the same manner as in Example 1, except that the temperature of the extruded fine reassembly to be discharged from the chopper was controlled at 75° C. during the extrusion process.

Figure 7:
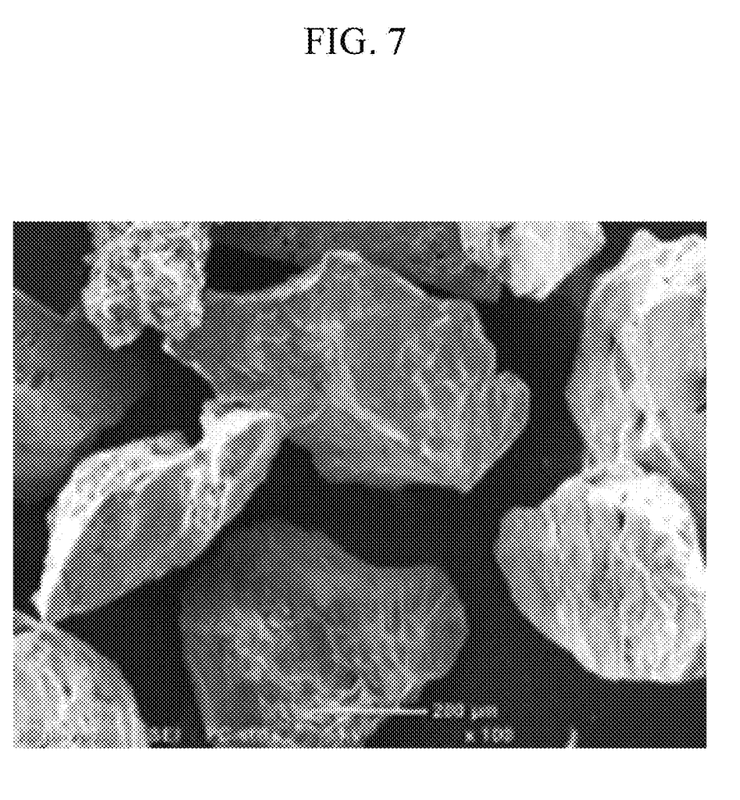

The particle shape of the finally manufactured extruded fine reassembly was analyzed by an electron microscope, and an image thereof is shown on FIG. 7. It was confirmed that the re-fines of Example 2 had a proportion of 22.7 wt %.

Comparative Example 6

100 g of the fines having a particle size of 150 μm or less in the super absorbent polymer manufactured in Preparation Example 1 was added in a mixer, and 120 g of water was added thereto while stirring at 650 rpm, and the obtained mixture was mixed for 1 minute to obtain a fine reassembly. The reassembly recovered in the mixer was put into a chopper, and extruded. The assembly was extruded by the chopper. However, due to the overload in the chopper, the chopper was stopped, the reassembly was not discharged out of the chopper, and the extruded fine reassembly was not manufactured.

Comparative Example 7

100 g of the fines having a particle size of 150 μm or less in the super absorbent polymer manufactured in Preparation Example 1 was added in a mixer, and 20 g of water was added thereto while stirring at 650 rpm, and the obtained mixture was mixed for 1 minute to obtain a fine reassembly.

The reassembly recovered in the mixer was put into a chopper, and extruded. The assembly was extruded by the chopper. However, the chopper was stopped, the reassembly was not discharged out of the chopper, and the extruded fine reassembly was not manufactured.

According to experimental results of Comparative Examples 1 to 5 and Examples 1 and 2, it was confirmed that in Examples 1 and 2, the extruded fine reassembly with high strength was obtained even though only about 20 parts by weight of water was used at the time of reassembling the fines, and thus the proportion of the formation of re-fines thereof was lower than those of Comparative Examples 1 to 4. Further, it was confirmed that Example 2 exhibited a lower proportion of the formation of re-fines similar to that of Comparative Example 5 using 120 parts by weight of water, even though only 20 parts by weight of water was used in Example 2.

On the other hand, it was confirmed that in Comparative Example 5, 120 parts by weight of water was used, and thus energy consumption for drying to remove moisture after reassembling the fines was very large. If the moisture was not capable of being properly removed, it was confirmed that the (extruded) fine reassembly could not be manufactured properly due to the overload of the device as in Comparative Examples 6 and 7.

Experimental Example

In order to evaluate physical properties of the (extruded) fine reassembly, the (extruded) fine reassemblies manufactured by Comparative Examples 3 and 5 and Examples 1 and 2 were classified, and physical properties of the reassemblies having a particle diameter of 300 μm or more to less than 600 μm were measured by the following method, and results thereof are shown in Table 1.

(1) Centrifugal Retention Capacity (CRC)

The centrifugal retention capacity was measured on the basis of EDANA method WSP 241.3. 0.2 g of a sample including a particle diameter of 300 or more to less than 600 μm in the manufactured fine reassembly was put into a tea bag and precipitated in 0.9% brine solution for 30 minutes. Then, dehydration was performed for 3 minutes with 250 G (gravity) of centrifugal force, and an amount $W_2$ (g) at which the brine solution was absorbed was measured. In addition, the same operation was performed without using the extruded fine reassembly, and then a mass $W_1$ (g) was measured.

The CRC (g/g) was calculated according to the following Equation 1 using each of the thus-obtained masses, thereby confirming the CRC.

$$CRC(g/g)=\{[W_2(g)-W_1(g)]/W_0(g)\}-1 \quad \text{[Equation 1]}$$

in Equation 1, $W_0$ (g) is an initial weight (g) of the extruded fine reassembly, $W_1$ (g) is a weight of a device, measured after dehydration with 250 G for 3 minutes using a centrifuge without using the extruded fine reassembly, and $W_2$ (g) is a weight of the device, measured by including the extruded fine reassembly which is obtained after immersing the extruded fine reassembly in 0.9 wt % physiological saline at room temperature for 30 minutes for absorption, and then dehydrating the extruded fine reassembly with 250 G for 3 minutes using a centrifuge.

(2) Absorption Speed (Vortex)

The absorption speed was measured for the extruded fine reassembly. The absorption speed was measured by putting 50 ml of saline into a 100 ml beaker together with a magnetic bar. The agitation speed was set to 600 rpm using a stirrer. 2.0 g of the extruded fine reassembly was put into the stirring saline, and the time when putting the extruded fine reassembly was simultaneously measured. The time measurement was terminated at the point when the vortex disappeared in the beaker.

TABLE 1

|  | Added material (g) (based on 100 fines) | Assembly temperature (° C.) | Whether extrusion is performed or not (O/X) | Proportion of re-fines (%) | CRC (g/g) | Vortex (sec) |
| --- | --- | --- | --- | --- | --- | --- |
| Comparative Example 5 | 120 | 20 | X | 22.8 | 39.3 | 52 |
| Comparative Example 3 | 20 | 20 | X | 53.1 | 32.9 | 21 |
| Example 1 | 20 | 45 | O | 47.7 | 38.7 | 33 |
| Example 2 | 20 | 75 | O | 22.7 | 43.4 | 48 |

Referring to Table 1, it was confirmed that the extruded fine reassemblies of Examples 1 and 2 exhibited the absorption ability (CRC) which is equal to or higher than those of Comparative Examples 3 and 5 and excellent absorption speed.

On the other hand, it was confirmed that Comparative Example 3 had a disadvantage in that the absorption ability was poor and the proportion of the formation of re-fines was large, and further confirmed that Comparative Example 5 caused large energy consumption in the drying process due to a very large water consumption and exhibited a poor absorption speed.

The invention claimed is:

1. A manufacturing method of a super absorbent polymer comprising:
    preparing a hydrogel polymer by performing thermal polymerization or photopolymerization on a monomer composition including a water-soluble ethylenically unsaturated monomer and a polymerization initiator;
    drying and pulverizing the hydrogel polymer, and performing classification into fines having a particle diameter of 150 μm or less and normal particles having a particle diameter of more than 150 μm to 850 μm or less;
    manufacturing a fine reassembly by mixing the fines with water, followed by reassembling; and
    manufacturing an extruded fine reassembly by extruding, pulverizing, and classifying the fine reassembly,
    wherein in the manufacturing of the fine reassembly, 1 to 30 parts by weight of water is used based on 100 parts by weight of the fines, and
    the manufacturing of the extruded fine reassembly includes extruding the fine reassembly at a temperature of 40 to 105° C.

2. The manufacturing method of claim 1, wherein:
    the extruding is performed in a chopper that extrudes and cuts the fine reassembly.

3. The manufacturing method of claim 1, wherein:
    the manufacturing of the fine reassembly includes mixing the fines and the water in a mixing device capable of applying a shear force.

4. The manufacturing method of claim 3, wherein:
    in the manufacturing of the fine reassembly, the fines and the water are mixed with stirring at 300 to 2000 rpm.

5. The manufacturing method of claim 1, wherein:
    the manufacturing of the extruded fine reassembly is performed in an extruder equipped with a cutter which extrudes and cuts the fine reassembly.

6. The manufacturing method of claim 1, wherein:
    the manufacturing of the extruded fine reassembly further includes drying between the extruding and the pulverizing.

7. The manufacturing method of claim 6, wherein:
    the drying is performed at 120 to 220° C.

8. The manufacturing method of claim 1, wherein:
    the manufacturing of the extruded fine reassembly includes classifying the extruded and pulverized fine reassembly into reassembly fines having a particle diameter of 150 μm or less and reassembly normal particles having a particle diameter of more than 150 μm to 850 μm or less.

9. The manufacturing method of claim 1, wherein:
in an extruded fine reassembly having a particle diameter of 300 to 600 μm, a centrifugal retention capacity (CRC) measured according to EDANA method WSP 241.3 is 33.0 to 45.0 g/g, and an absorption speed by a vortex method is 50 seconds or less.

10. The manufacturing method of claim 1, further comprising:
surface cross-linking the extruded fine reassembly.

* * * * *